US012576898B2

(12) United States Patent

Russo

(10) Patent No.: US 12,576,898 B2

(45) Date of Patent: Mar. 17, 2026

(54) TRANSPORTATION CART

(71) Applicant: MSI Media LLC, Nashville, TN (US)

(72) Inventor: Tim Russo, Murfreesboro, TN (US)

(73) Assignee: MSI MEDIA LLC, Nashville, TN (US)

( * ) Notice: Subject to any disclaimer, the term of this patent is extended or adjusted under 35 U.S.C. 154(b) by 321 days.

(21) Appl. No.: 18/122,488

(22) Filed: Mar. 16, 2023

(65) Prior Publication Data

US 2024/0308562 A1    Sep. 19, 2024

(51) Int. Cl.
  B62B 3/10      (2006.01)
  B62B 3/00      (2006.01)
  B62B 3/02      (2006.01)
  B62B 3/04      (2006.01)
  B62B 5/06      (2006.01)

(52) U.S. Cl.
  CPC .............. B62B 3/108 (2013.01); B62B 3/002 (2013.01); B62B 3/02 (2013.01); B62B 3/04 (2013.01); B62B 5/061 (2013.01); *B62B 2202/12* (2013.01); *B62B 2202/30* (2013.01); *B62B 2202/56* (2013.01)

(58) Field of Classification Search
  CPC .......... B62B 3/108; B62B 3/10; B62B 3/002; B62B 3/02; B62B 3/04; B62B 3/00; B62B 3/102; B62B 3/104; B62B 3/005; B62B 5/00; B62B 5/061; B62B 5/06; B62B 5/068; B62B 2202/12; B62B 2202/30; B62B 2202/56; B62B 2203/00; B62B 2203/40; B62B 2203/44; B62B 2203/60
  See application file for complete search history.

(56) References Cited

U.S. PATENT DOCUMENTS

| | | | | | |
|---|---|---|---|---|---|
| 3,376,046 | A | * | 4/1968 | Kivett ...................... | B62B 1/10 206/508 |
| 3,735,996 | A | * | 5/1973 | Rath ..................... | B62B 5/0083 280/47.131 |
| 3,841,650 | A | * | 10/1974 | Miskelly ............... | B62B 5/0083 280/37 |
| 3,857,579 | A | * | 12/1974 | Hoodenpyle ........... | B62B 1/002 280/47.27 |
| 3,884,491 | A | * | 5/1975 | Hughart ................... | B62B 1/20 280/47.131 |

(Continued)

OTHER PUBLICATIONS

Corresponding co-pending U.S. Appl. No. 29/899,500, filed Apr. 13, 2023.

(Continued)

*Primary Examiner* — James M Dolak

(74) *Attorney, Agent, or Firm* — Wesley M. Barbee; Baker, Donelson, Bearman, Caldwell & Berkowitz

(57)            ABSTRACT

A transportation cart configured to transport video projection screen cases comprises a base frame for supporting a video projection screen case; a plurality of ground engaging units for supporting the base frame from a ground surface; a containment frame located a distance above the base frame and connected thereto; and a first and second strap configured to secure cargo. The transportation cart is also configured to transport a plurality of multipurpose tables and comprises a base; a plurality of ground engaging units for supporting the base from a ground surface; a first and second vertical support extending up from the base.

8 Claims, 10 Drawing Sheets

(56)  References Cited

U.S. PATENT DOCUMENTS

| | | | | |
|---|---|---|---|---|
| 3,923,318 A * | 12/1975 | Renard | A45C 13/385 | |
| | | | 280/35 | |
| 3,963,256 A * | 6/1976 | Stafford | A45C 13/385 | |
| | | | 280/35 | |
| 4,545,592 A * | 10/1985 | Taskovic | A45C 13/385 | |
| | | | 280/35 | |
| 4,846,485 A * | 7/1989 | Payne | F16M 11/24 | |
| | | | 280/47.27 | |
| 4,878,682 A * | 11/1989 | Lee | B62B 3/025 | |
| | | | 211/195 | |
| 5,564,723 A * | 10/1996 | Breeden | B62B 3/04 | |
| | | | 410/97 | |
| 5,806,868 A * | 9/1998 | Collins | B62B 1/264 | |
| | | | 280/655 | |
| 6,079,941 A * | 6/2000 | Lee | B62B 3/04 | |
| | | | 414/812 | |
| 6,382,643 B1 * | 5/2002 | Baker | B62B 5/0083 | |
| | | | 280/47.11 | |
| D491,368 S * | 6/2004 | Koenig | D3/318 | |
| 6,793,223 B2 * | 9/2004 | Ondrasik | B60B 33/0039 | |
| | | | 280/47.35 | |
| 6,880,838 B2 * | 4/2005 | Hjorth | B62B 3/08 | |
| | | | 280/33.996 | |
| 6,923,468 B1 * | 8/2005 | Barnett | B62B 19/02 | |
| | | | 280/35 | |
| 6,964,423 B1 * | 11/2005 | Chieh | B62B 5/0083 | |
| | | | 280/79.5 | |
| 6,974,140 B2 * | 12/2005 | Neuman | B62B 3/108 | |
| | | | 403/322.2 | |
| 7,097,182 B1 * | 8/2006 | Liu | B62B 3/02 | |
| | | | 280/42 | |
| 7,195,257 B2 | 3/2007 | Stoneback et al. | | |
| 8,628,097 B1 * | 1/2014 | Elias | B62B 5/0093 | |
| | | | 280/79.2 | |
| 8,801,005 B1 * | 8/2014 | Flickner | B62B 3/104 | |
| | | | 280/47.35 | |
| 9,615,638 B2 * | 4/2017 | Moskowitz | A45C 13/262 | |
| 10,214,229 B2 | 2/2019 | Brown | | |
| 10,286,943 B1 * | 5/2019 | Greenblatt | B65D 19/42 | |
| 10,464,750 B2 * | 11/2019 | Pruskauer | B65G 7/12 | |
| 10,766,516 B2 * | 9/2020 | Finstad | B62B 3/002 | |
| 10,836,415 B1 | 11/2020 | Morrow | | |
| 11,679,794 B2 * | 6/2023 | Greenblatt | B62B 5/067 | |
| | | | 280/33.998 | |
| 11,708,103 B2 * | 7/2023 | Greenblatt | B65G 49/05 | |
| | | | 280/33.998 | |
| 12,187,336 B2 * | 1/2025 | Hanlon | B62B 3/16 | |
| 12,351,226 B2 * | 7/2025 | Chen | B62B 3/022 | |
| 12,384,439 B2 * | 8/2025 | Foster | B62B 3/005 | |
| 12,479,487 B2 * | 11/2025 | Mikeal | B62B 3/0606 | |
| 12,479,488 B2 * | 11/2025 | Russo | B62B 3/10 | |
| 2001/0005070 A1 * | 6/2001 | Kemnitzer | B62B 3/108 | |
| | | | 280/79.2 | |
| 2003/0053898 A1 * | 3/2003 | Wamsley | B25H 1/0007 | |
| | | | 414/494 | |
| 2004/0195788 A1 | 10/2004 | Ondrasik et al. | | |
| 2006/0103094 A1 | 5/2006 | Wiff et al. | | |
| 2010/0283227 A1 * | 11/2010 | Perelli | B62B 3/008 | |
| | | | 280/639 | |

OTHER PUBLICATIONS

Corresponding co-pending U.S. Appl. No. 29/899,501, filed Apr. 13, 2023.

* cited by examiner

TRANSPORTATION CART

FIELD OF THE DISCLOSURE

The present disclosure relates to transportation carts including but not limited to transportation carts configured to transport video projection screen cases and multipurpose tables.

BACKGROUND

Various pieces of equipment are commonly used in the video, audio, lighting, and production industry, including multipurpose tables and video projector screens to name a few examples. Such equipment is often bulky and difficult to transport from one location to another.

FIG. 1 illustrates a conventional video projector screen, generally designated by the number 10. Conventional video projector screens 10 are configured to be disassembled for storage and transportation purposes. Each conventional projector screen 10 is transported in three video projection screen cases, each generally designated by the number 12. FIG. 2 illustrates the video projection screen case 12.

FIG. 7 illustrates a conventional multipurpose table, generally designated by the number 20. Conventional multipurpose tables 20 include a base structure 22 and a plurality of telescoping supports 24 that are couplable to the base structure 22. When the multipurpose table 20 is a support configuration, each of the plurality of telescoping supports 24 are coupled to a corner of the base structure 22 to support the base structure from a ground surface 26. FIG. 7 illustrates the multipurpose table 20 in the support configuration. The base structure 22 further includes a storage bracket 28. When the multipurpose table 20 is in a transportation configuration, each of the plurality of telescoping supports 24 are coupled to the storage bracket 28. FIG. 8 illustrates the multipurpose table 20 in the transportation configuration. It is typical for a plurality of the conventional multipurpose tables 20 to be used on a single production scenario.

SUMMARY OF THE DISCLOSURE

Accordingly, a need exists to provide a transportation cart for transporting video, audio, lighting, and production equipment. A new transportation cart is disclosed herein.

In one embodiment a transportation cart configured to transport video projection screen cases comprises a base frame for supporting a video projection screen case; a first and second base support rail, each base support rail extending from a first side of the base frame to a second side of the base frame; a first and second strap support rail, each strap support rail extending from a third side of the base frame to the first base support rail; a third and fourth strap support rail, each strap support rail extending from a fourth side of the base frame to the second base support rail; a plurality of ground engaging units for supporting the base frame from a ground surface; a containment frame located a distance above the base frame and connected thereto; a first strap in contact with the first and second strap support rails, the strap being configurable to secure cargo; and a second strap in contact with the third and fourth strap support rails, the strap being configurable to secure cargo.

In another embodiment a transportation cart configured to transport a plurality of multipurpose tables comprises a base having a first side, a second side, a third side, and a fourth side; a plurality of ground engaging units for supporting the base from a ground surface; a first vertical support extending up from the first side of the base; a second vertical support extending up from the second side of the base; wherein each of the first vertical support and the second vertical support include a first vertical post; a second vertical post; a cross-member including a first end and a second end, the cross-member configurable to extend horizontally from the first vertical post to the second vertical post; and wherein the first end of the cross-member of the first vertical support is pivotally coupled to the first vertical post of the first vertical support and the second end of the cross-member of the first vertical support is releasably couplable to the second vertical post of the first vertical support.

In another embodiment a transportation cart configured to transport a plurality of multipurpose tables comprises an overframe having a first side, a second side, a third side, and a fourth side; a plurality of ground engaging units for supporting the overframe from a ground surface, each of the plurality of ground engaging units being mounted at a corner of the overframe; a first and second intermediate support underlying the overframe, each of the first and second intermediate supports including a first portion fixed to the first side of the overframe and a second portion fixed to the second side of the overframe; a first vertical support extending up from the first portions of the first and second intermediate supports; a second vertical support extending up from the second portions of the first and second intermediate supports; wherein each of the first vertical support and the second vertical support include a first vertical post; a second vertical post; and a cross-member including a first end and a second end, the cross-member configurable to extend horizontally from the first vertical post to the second vertical post.

Numerous objects, features and advantages of the present invention will be readily apparent to those skilled in the art upon a review of following description in conjunction with the accompanying drawings.

DETAILED DESCRIPTION

Video Projection Screen Case Transportation Cart

Figure 1:
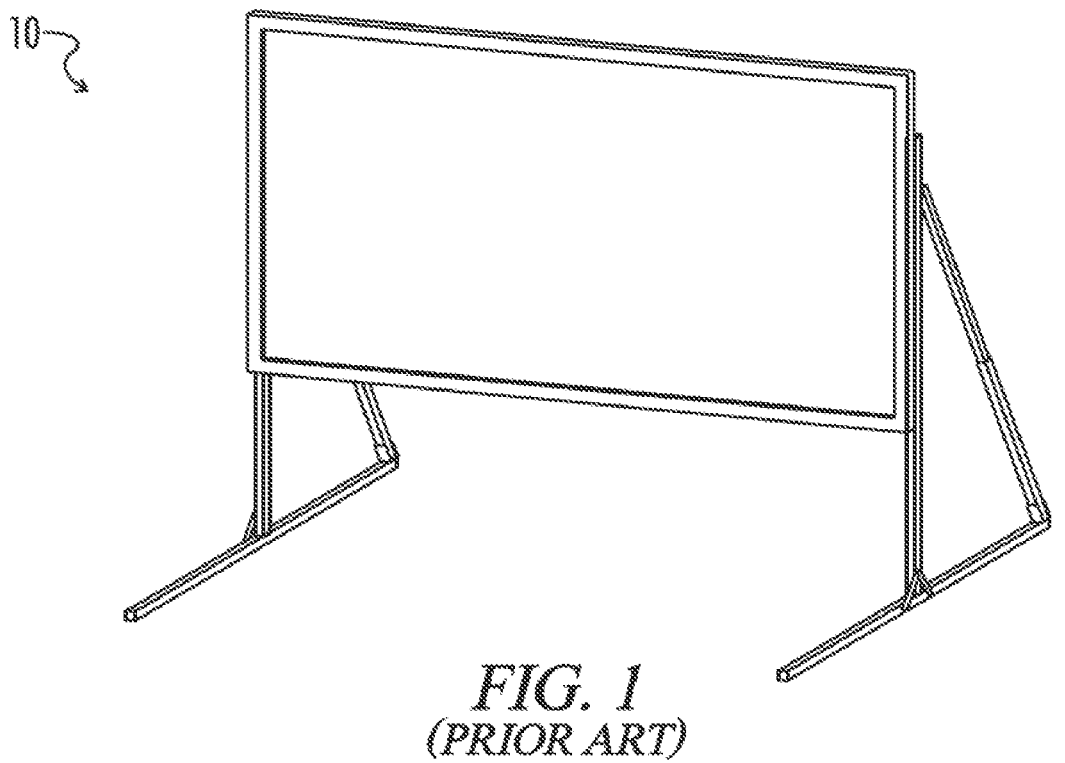
FIG. 1 is a perspective view of a prior art video projector screen.
Figure 2:
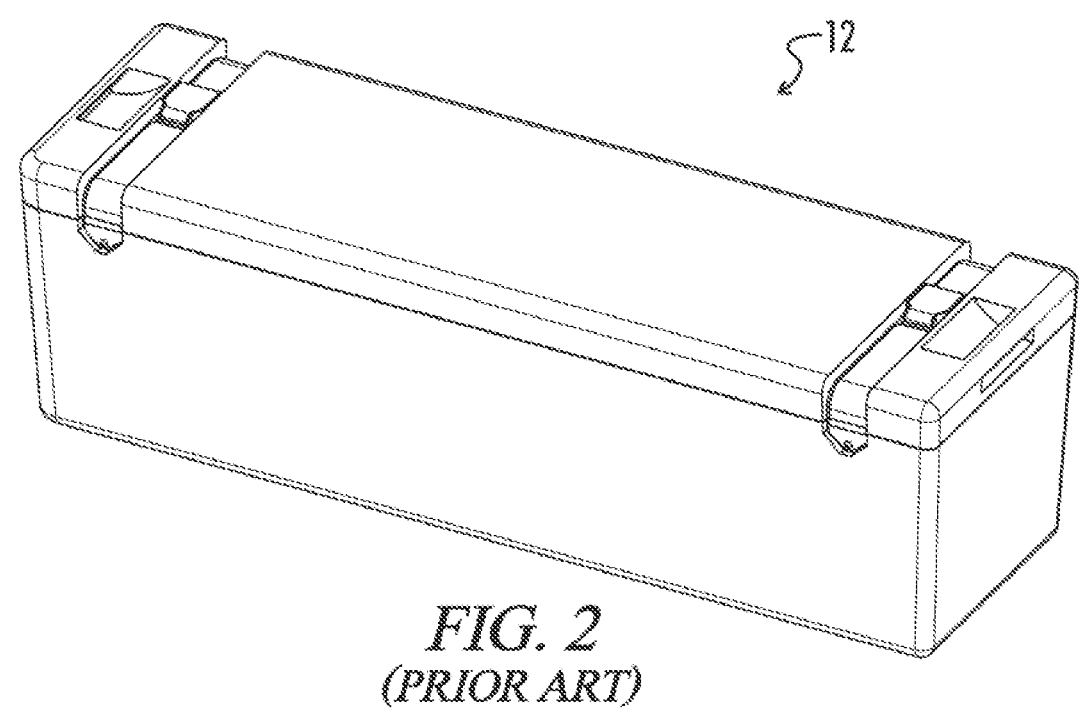
FIG. 2 is a perspective view of a prior art video projection screen case.
Figure 3:
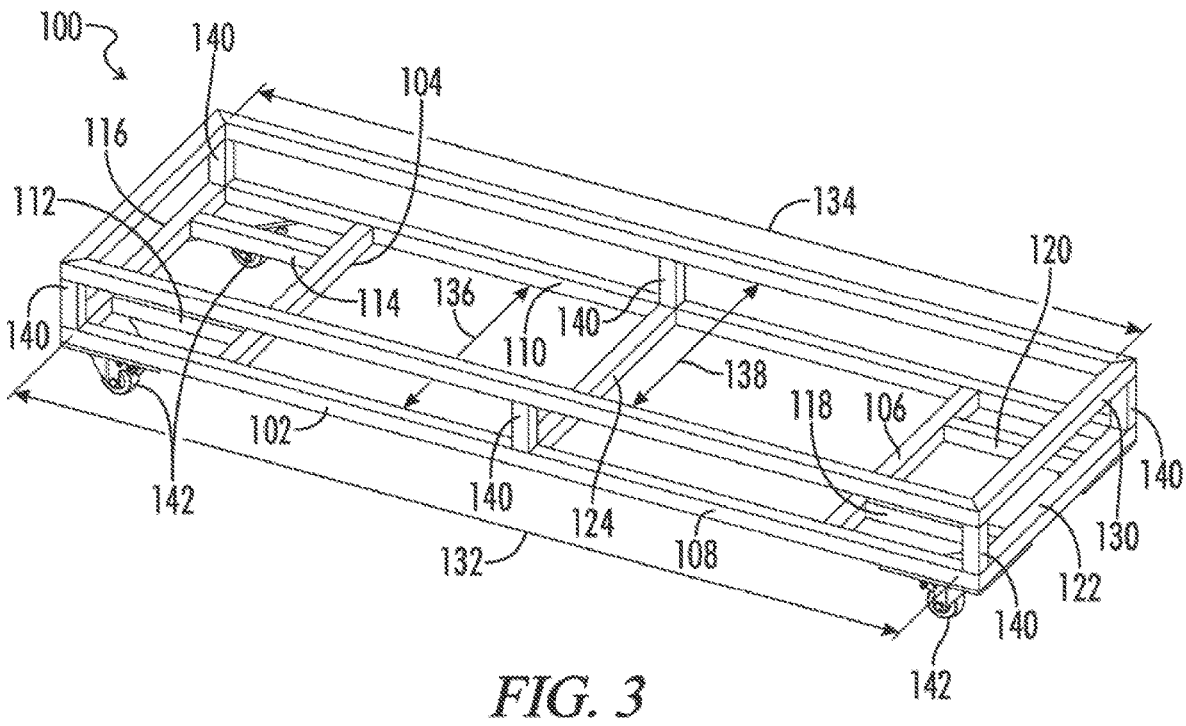
FIG. 3 is a perspective view of a transportation cart configured to transport video projection screen cases.
Figure 4:
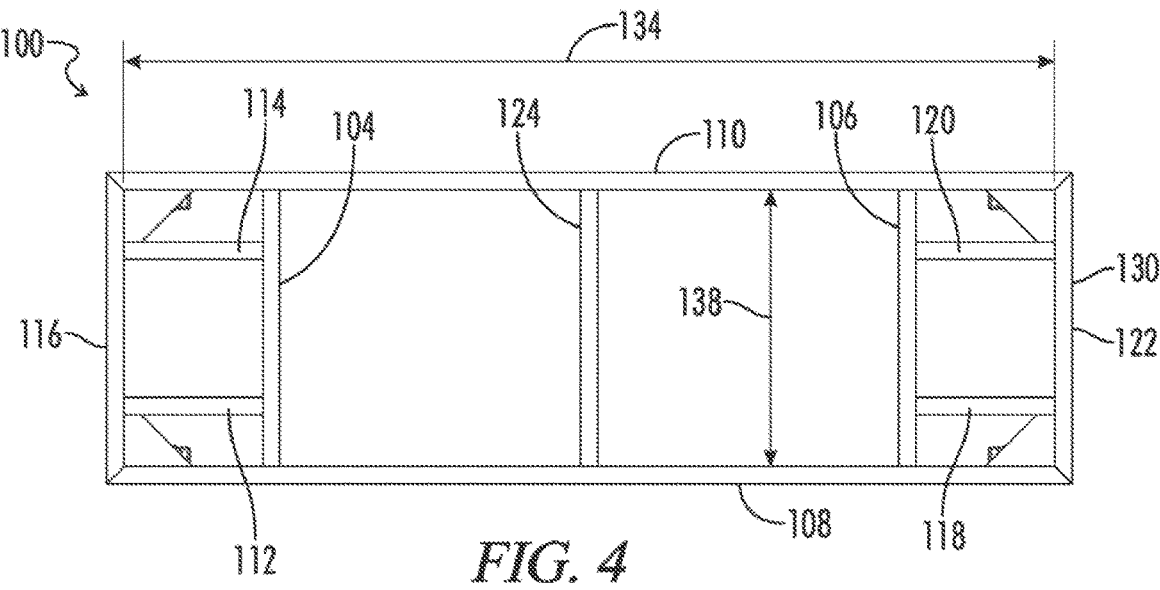
FIG. 4 is a top view of the transportation cart configured to transport video projection screen cases.

Referring now to the drawings and particularly to FIGS. 3 and 4, a transportation cart is shown and generally designated by the number 100. Transportation cart 100 is configured to transport one or more of the video projection screen cases 12.

The transportation cart 100 includes a base frame 102 for supporting the video projection screen case 12. The transportation cart 100 further includes a first base support rail 104 and a second base support rail 106. The first base support rail 104 and the second base support rail 106 extend from a first side 108 of the base frame 102 to a second side 110 of the base frame 102. The transportation cart 100 further includes a first strap support rail 112 and a second strap support rail 114. The first strap support rail 112 and the second strap support rail 114 extend from a third side 116 of the base frame 102 to the first base support rail 104. The transportation cart 100 further includes a third strap support rail 118 and a fourth strap support rail 120. The third strap support rail 118 and the fourth strap support rail 120 extend from a fourth side 122 of the base frame 102 to the second base support rail 106. The base frame 102 includes a central support 124 that extends from the first side 108 of the base frame 102 to the second side 110 of the base frame 102

The transportation cart 100 includes a containment frame 130 that is located a distance above the base frame 102 and is connected thereto. Preferably, the containment frame 130 is located in a range of from 2 inches to 22 inches above the base frame 102, preferably from 6 inches to 16 inches above the base frame 102, and most preferably from 10 inches to 14 inches above the base frame 102.

A base frame opening length 132 is the same as a containment frame opening length 134. A base frame opening width 136 is the same as a containment frame opening width 138. The base frame opening length 132 is in a range of from 44 inches to 64 inches, preferably from 48 inches to 60 inches, and most preferably from 52 inches to 56 inches. The base frame opening width 136 is in a range of from 6 inches to 26 inches, preferably from 10 inches to 22 inches, and most preferably from 14 inches to 18 inches. The containment frame opening length 134 is in a range of from 44 inches to 64 inches, preferably from 48 inches to 60 inches, and most preferably from 52 inches to 56 inches. The containment frame opening width 138 is in a range of from 6 inches to 26 inches, preferably from 10 inches to 22 inches, and most preferably from 14 inches to 18 inches. The length 132 of the base frame 102 and the width 136 of the base frame 102 are measured from the inside of the base frame 102, as illustrated in FIG. 3. The base frame opening length 132 and the base frame opening width 136 are measured from the inside of the base frame 102, as illustrated in FIG. 4. The containment frame opening length 134 and the containment frame opening width 138 are measured from the inside of the containment frame 130, as illustrated in FIG. 3. A plurality of containment frame supports 140 extend up from the corners of the base frame 102 to the containment frame 130 and extend up from a middle of the base frame where the central support 124 is fixed to the containment frame 130.

The base frame 102 and the containment frame 130 are formed from tubing with a thickness in a range of from 0.5 inches to 1.5 inches, preferably from 0.7 inches to 1.3 inches, and most preferably from 0.9 inches to 1.1 inches. Preferably, the tubing is aluminum because of aluminum's strength and light weight properties.

The transportation cart 100 includes a plurality of ground engaging units 142 for supporting the base frame 102 from the ground surface 26. The plurality of ground engaging units 142 may be caster wheels configured to support heavy loads. The plurality of ground engaging units 142 could be any ground engaging unit 142 that provides rolling support.

Figure 5A:
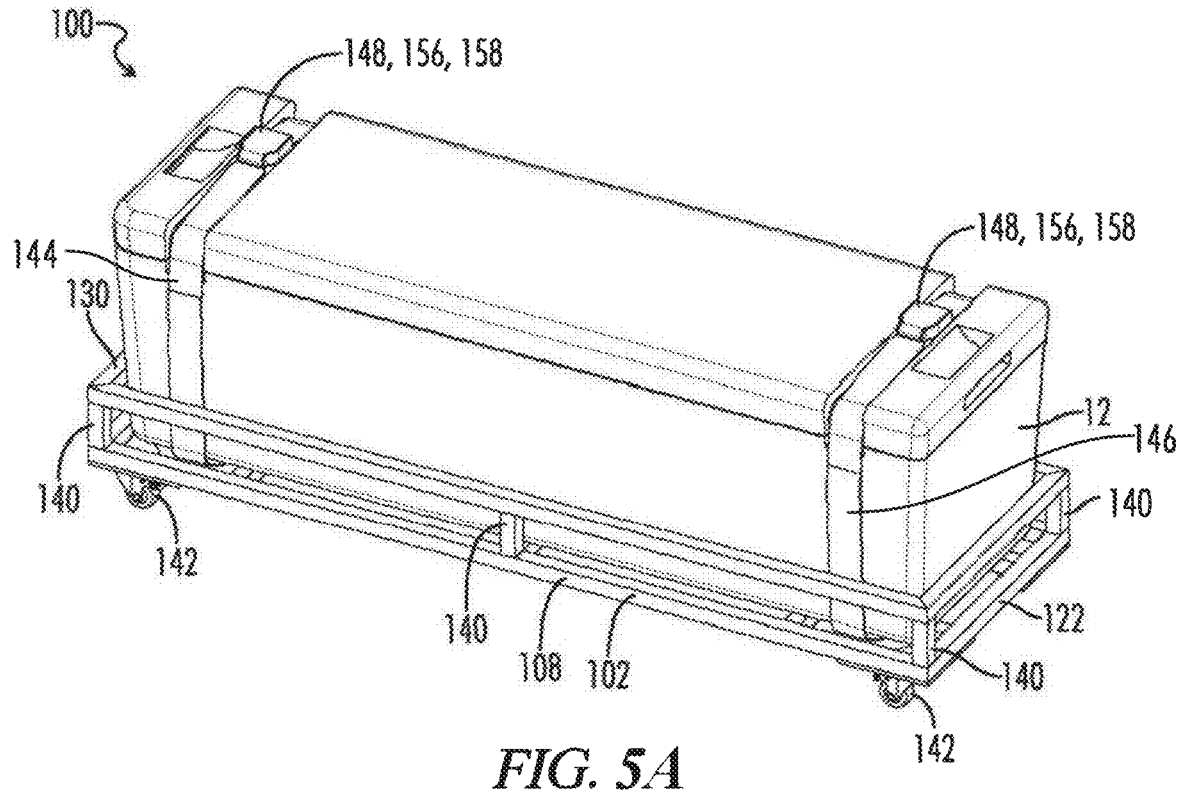
FIG. 5A is a perspective view of the transportation cart configured to transport video projection screen cases supporting one video projection screen case including a first and second strap in a closed position.
Figure 5B:
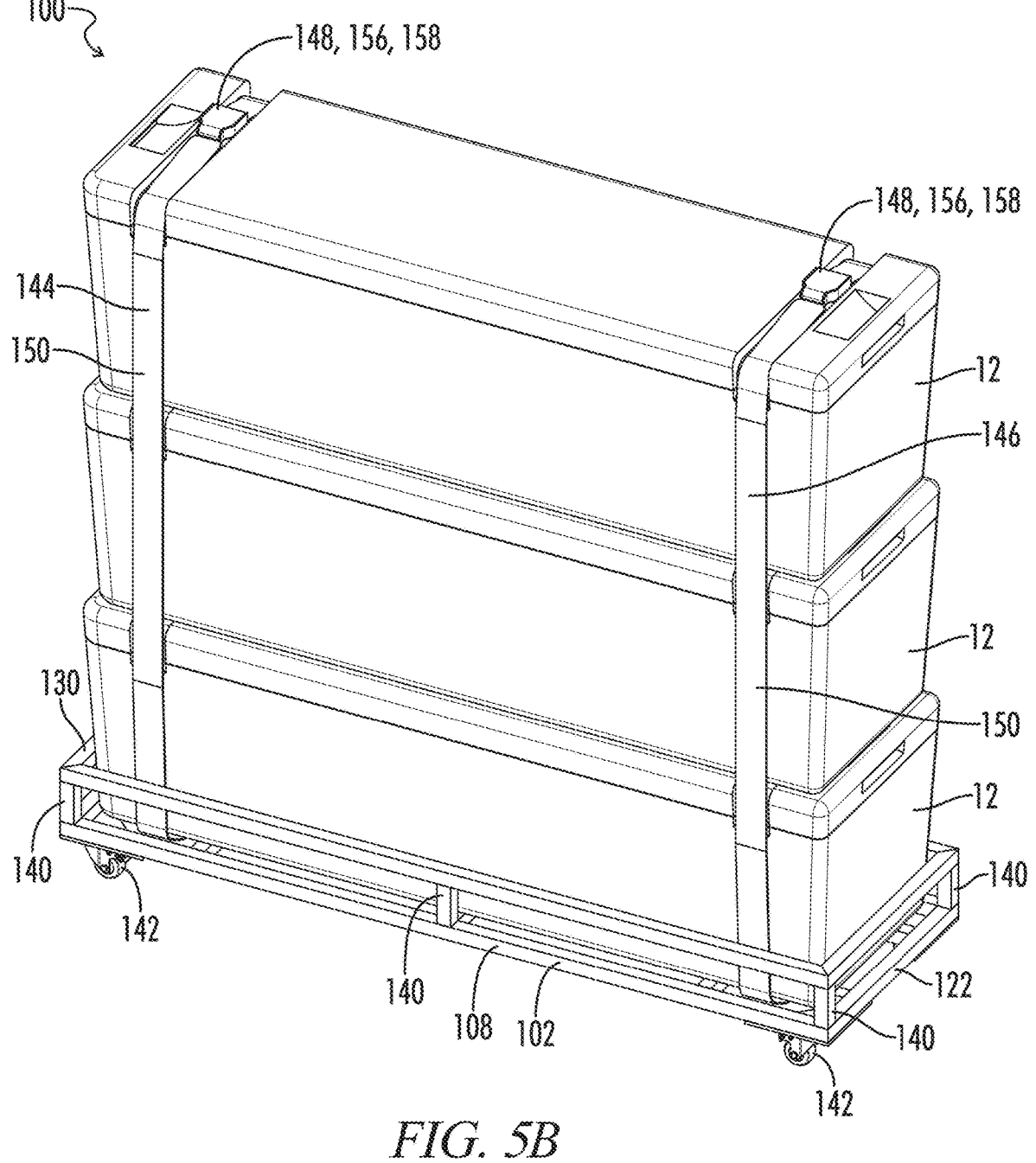
FIG. 5B is a perspective view of the transportation cart configured to transport video projection screen cases supporting three video projection screen cases including the first and second strap in the closed position.

Referring now to FIGS. 5A and 5B, the transportation cart 100 includes three video projection screen cases 12, also referred to as a cargo boxes, supported by the base frame 102. The transportation cart 100 is configured to support one, two, three, or more video projection screen cases 12. The video projection screen cases 12 are configured to be stacked in a vertical direction and placed in the transportation cart 100.

Figure 6:
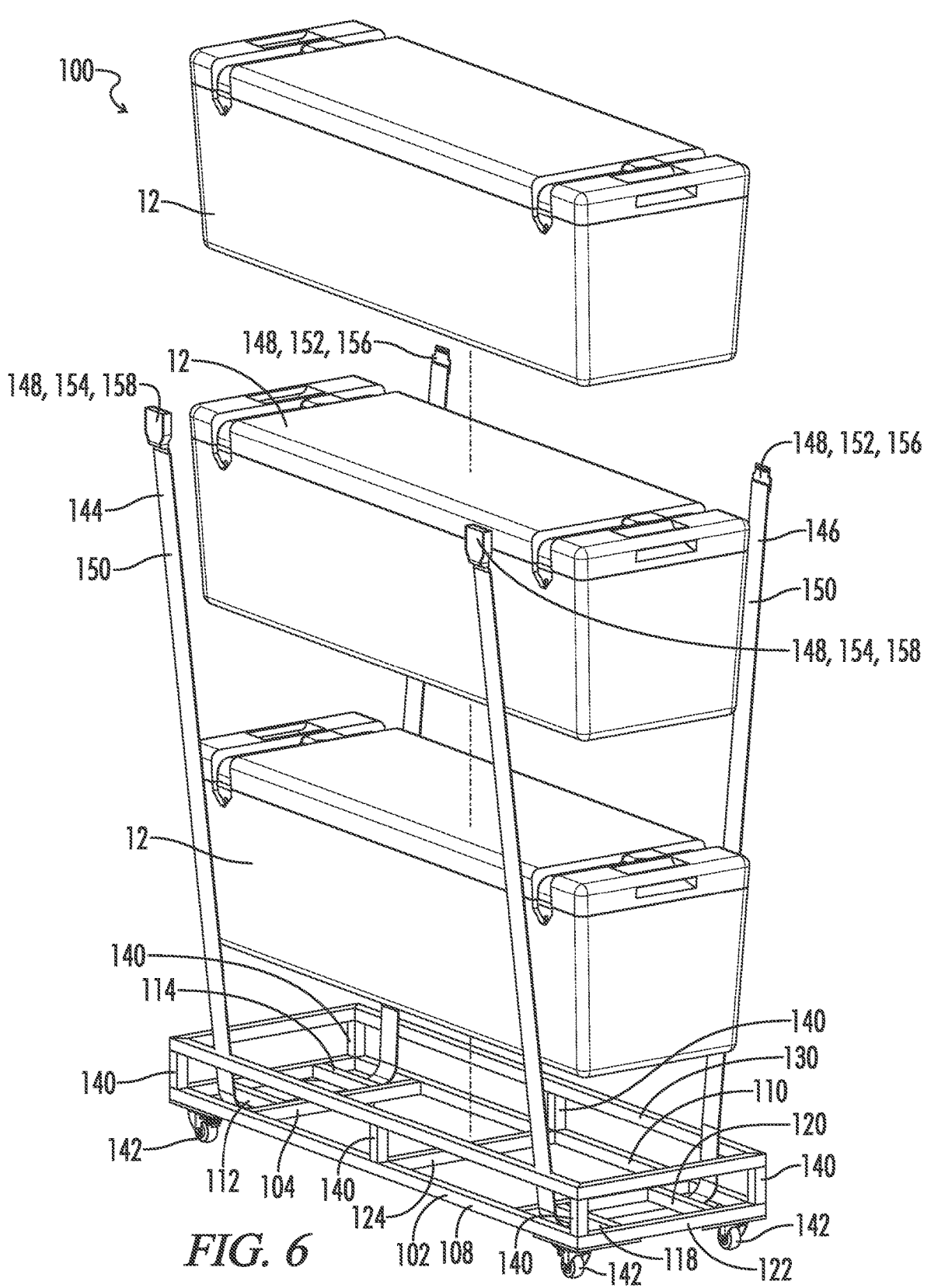
FIG. 6 is an exploded perspective view of the transportation cart configured to transport video projection screen cases supporting three video projection screen cases including the first and second strap in an open position.

The transportation cart 100 includes a first strap 144 and a second strap 146. Each of the first strap 144 and the second strap 146 include a coupler portion 148 and a belt portion 150. A length of the first strap 144 and second strap 146 is adjustable to compensate for a variety of video projection screen case configurations. The first strap 144 and the second strap 146 are configurable in either a closed position or an open position. Each of the first strap 144 and the second strap 146 are in a closed position when a first end 152 and a second end 154 of the strap are coupled and the strap forms a closed loop. The first strap 144 and the second strap 146 are depicted in the closed position in FIGS. 5A and 5B. Each of the first strap 144 and the second strap 146 are in the open position when the first end 152 and the second end 154 of the strap are decoupled. The first strap 144 is depicted in the open position in FIG. 6. The coupler portion 148 can be a tongue and buckle coupler as depicted in FIGS. 5A, 5B, and 6, or the like. The tongue portion 156 is selectively coupleable to the buckle portion 158. The belt portion 150 could be composed of woven polyester as depicted in FIGS. 5A, 5B, and 6, or the like.

The first strap 144 is in contact with the first strap support rail 112 and the second strap support rail 114. The second strap 146 is in contact with the third strap support rail 118 and the fourth strap support rail 120. In the embodiment shown, the first strap 144 passes underneath the first and second strap support rails 112, 114 and the second strap 146 passes underneath the third and fourth strap support rails 118, 120. The first strap 144 and the second strap 146 are configurable to secure cargo on the transportation cart 100. In an alternative embodiment, the first strap 144 may include a first piece and a second piece, the first piece being attached to the first strap support rail 112 and the second piece being attached to the second strap support rail 114. The second strap may include a first piece and a second piece, the first piece being attached to the third strap support rail 118 and the second piece being attached to the fourth strap support rail 120.

The first strap 144 and the second strap 146 are configured to circumscribe the video projection screen cases 12 that are being supported by the base frame 102. The first strap 144, the second strap 146, and the containment frame 130 are configured to restrict the movement of the video projection screen cases 12 being supported by the base frame 102 during transportation.

FIG. 6 illustrates the configuration of the first strap 144 and the second strap 146 in relation to the base frame 102 and the video projection screen cases 12. In the embodiment shown, the first strap 144 passes through the space between the first side 108 of the base frame 102 and the first strap support rail 112, spans across an underside of the base frame 102, passes through the space between the second side 110 of the base frame 102 and the second strap support rail 114, and circumscribes the video projection screen cases 12. The second strap 146 passes through the space between the first side 108 of the base frame 102 and the third strap support rail 118, spans across the underside of the base frame 102, passes through the space between the second side 110 of the base frame 102 and the fourth strap support rail 120, and circumscribes the video projection screen cases 12. The first strap 144 and second strap 146 are configured to be cinched down around the video projection screen cases 12 to secure the video projection screen cases 12 to the base frame 102.

When the video projection screen cases 12 are secured to the base frame 102, a user may more easily transport the bulky video projection screen cases 12 by either pushing against the video projection screen cases 12, the base frame 102, or the containment frame 130. The transportation cart 100 is configured to be pushed an move in any desirable direction.

The use of video projector screens 10 in the video, audio, lighting, and production industry is prevalent. Video projector screens 10 are typically transported in several video projection screen cases 12. These cases can be bulky and difficult to transport. The transportation cart 100 is configured to transport one or more video projection screen cases 12 in an efficient manner. The transportation cart 100 is configured to support video projection screen cases 12 of various sizes.

Multipurpose Table Transportation Cart

Figure 7:
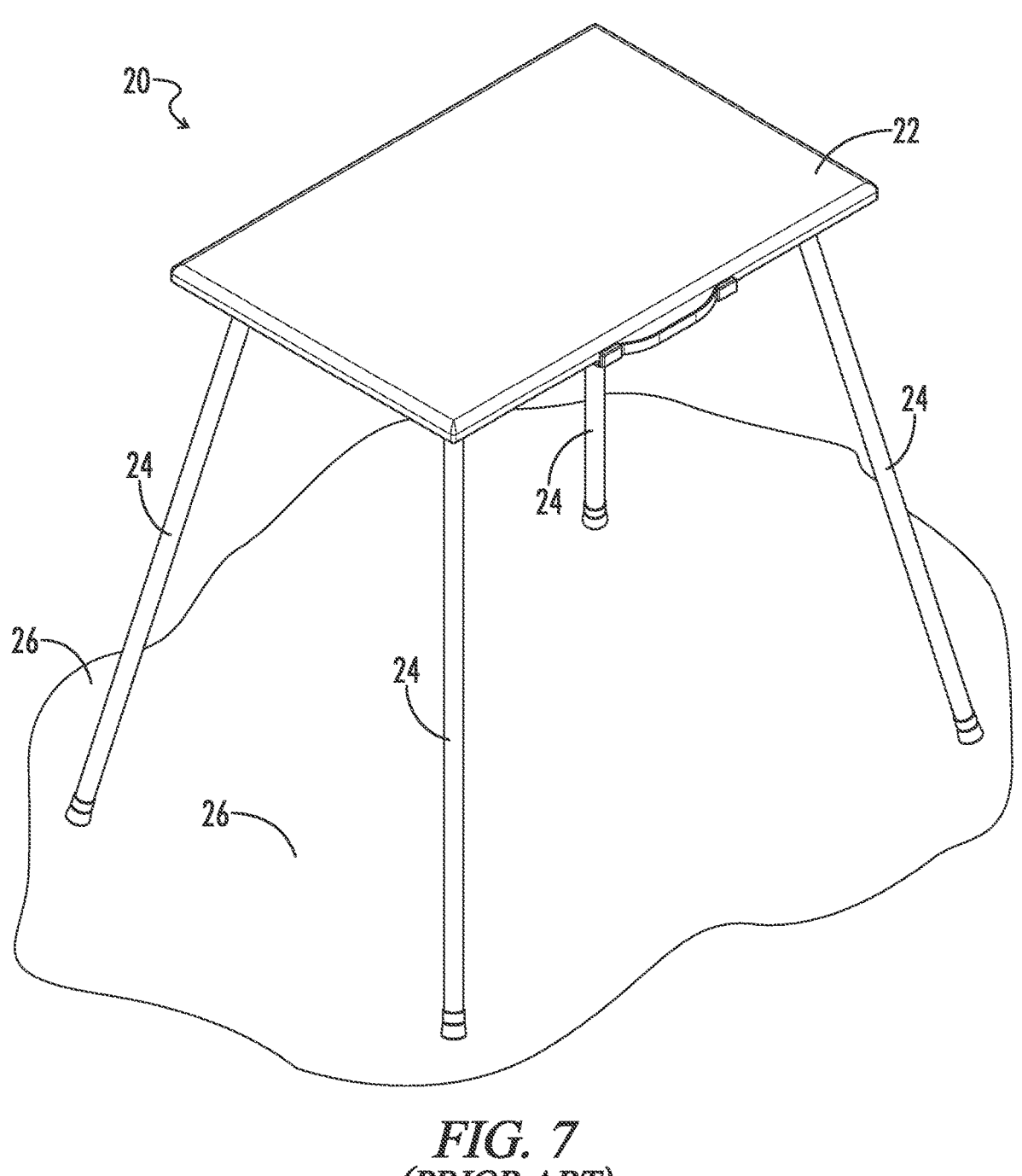
FIG. 7 is a perspective view of a prior art multipurpose table in a support configuration.
Figure 8:
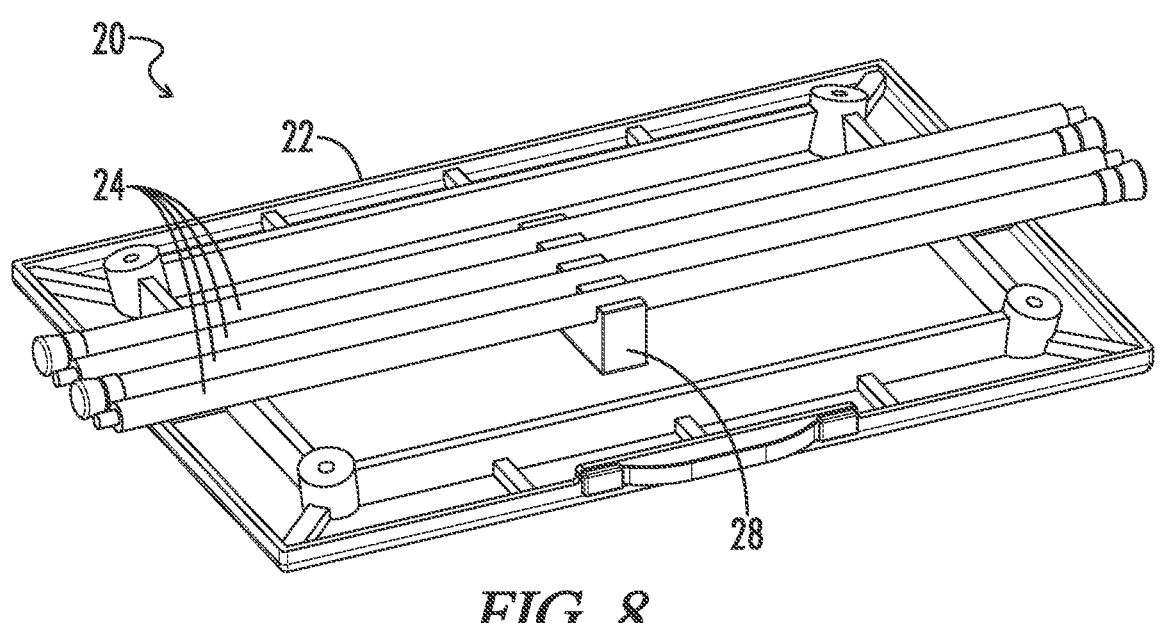
FIG. 8 is a perspective view of the prior art multipurpose table in a transportation configuration.
Figure 9:
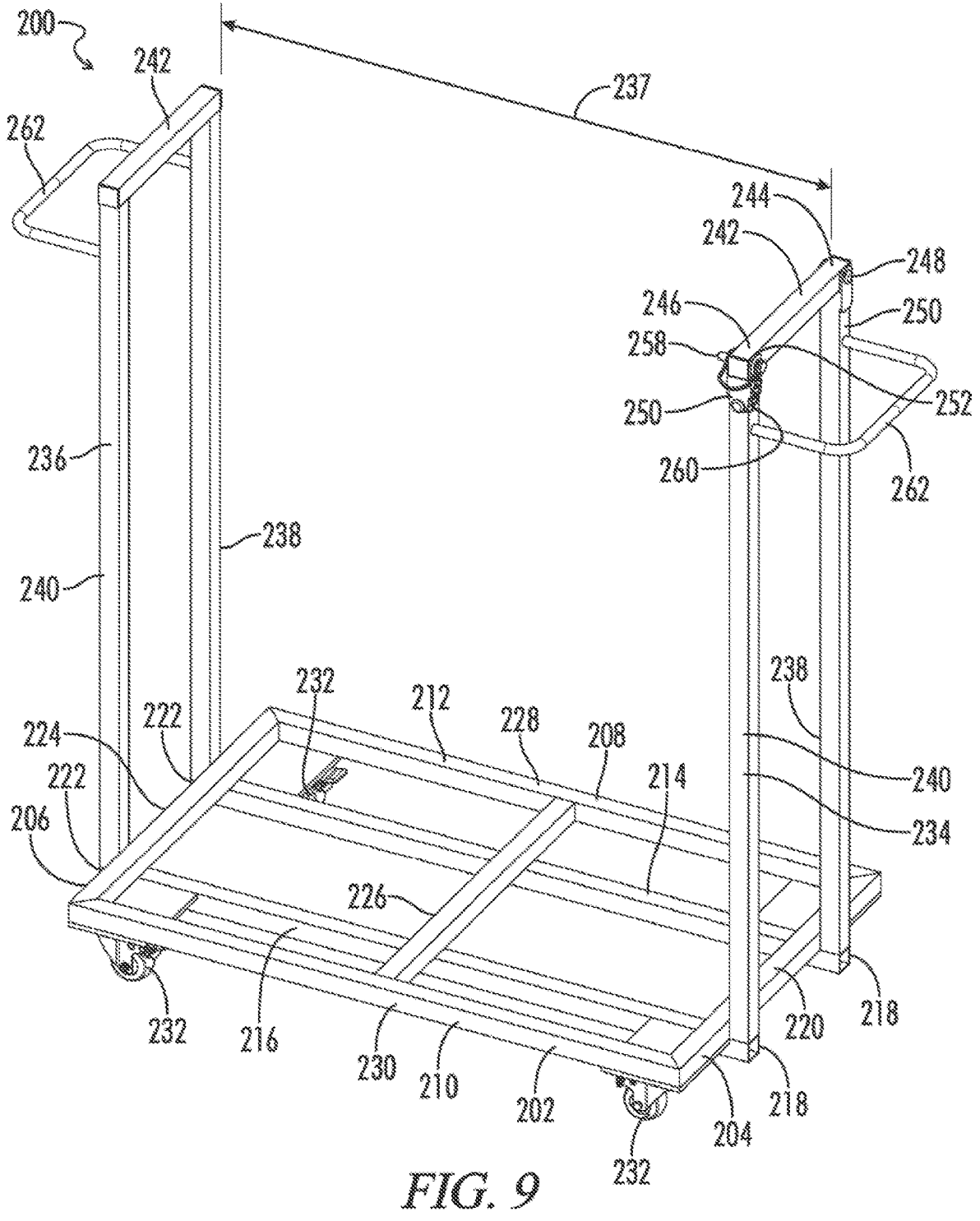
FIG. 9 is a perspective view of a transportation cart configured to transport a plurality of multipurpose tables.

Referring now to the drawings and particularly to FIG. 9, a transportation cart is shown and generally designated by the number 200. Transportation cart 200 is configured to transport one or more of the multipurpose tables 20. FIG. 7 illustrates the multipurpose table 20 in the support configuration. FIG. 8 illustrates the multipurpose table 20 in the transportation configuration.

The transportation cart 200 comprises a base 202. The base 202 has a first side 204, a second side 206, a third side 208, and a fourth side 210. The base includes an overframe 212, a first intermediate support 214, and a second intermediate support 216. Each of the first intermediate support 214 and the second intermediate support 216 underlie the overframe and include a first portion 218 fixed to a first end 220 of the overframe 212 and a second portion 222 fixed to a second end 224 of the overframe 212. The overframe 212 includes at least one central support 226 that extends from a first side 228 of the overframe 230 to a second side 230 of the overframe 230. A distance between the second end 224 of the overframe 212 and the first end 220 of the overframe 212 is in a range of from 24 inches to 40 inches, preferably from 28 inches to 36 inches, and most preferably from 30 inches to 34 inches. A distance between the third side 208 of the base 202 and the fourth side 210 of the base 202 is in a range of from 12 inches to 28 inches, preferably from 16 inches to 24 inches, and most preferably from 18 inches to 22 inches.

The transportation cart 200 includes a plurality of ground engaging units 232 for supporting the base 202 from the ground surface 26. Each of the plurality of ground engaging units 232 is coupled to a corner of the overframe 202 and the plurality of ground engaging units 202 are caster wheels to support heavy loads. The plurality of ground engaging units 202 could be any ground engaging unit 202 that provides rolling support.

The transportation cart 200 includes a first vertical support 234 that extends up from the first end 204 of the base 202. The transportation cart 200 includes a second vertical support 236 that extends up from the second side 206 of the base 202. The first vertical support 234 extends up from the first portions 218 of the first intermediate support 214 and the second intermediate support 216. The second vertical support 236 extends up from the second portions 222 of the first intermediate support 214 and the second intermediate support 216. A gap width 237 between the first vertical support 234 and the second vertical support 236 is in a range of from 19 inches to 35 inches, preferably from 23 inches to 31 inches, and most preferably from 25 inches to 29 inches.

Each of the first vertical support 234 and second vertical support 236 include a first vertical post 238, a second vertical post 240, and a cross-member 242. The cross-member 242 includes a first end 244 and a second end 246. The cross-member 242 is configurable to extend horizontally from the first vertical post 238 to the second vertical post 240. The first end 244 of the cross-member 242 of the first vertical support 234 is pivotally coupled to the first vertical post 238 of the first vertical support 234 at pivotal connection 248. The second end 246 of the cross-member 242 of the first vertical support 234 is releasably couplable to the second vertical post 240 of the first vertical support 234.

The second vertical post 240 of the first vertical support 234 includes a top portion 250. The top portion 250 of the second vertical post 240 of the first vertical support 234 includes a channel 252 configured to receive the second end 246 of the cross-member 242 of the first vertical support 234. The top portion 250 includes channel holes defined through opposite side walls of the channel 252, each channel hole generally designated by the number 254. The second end 246 of the cross-member 242 includes a cross-member hole 256 defined through the cross-member 242.

Figure 10:
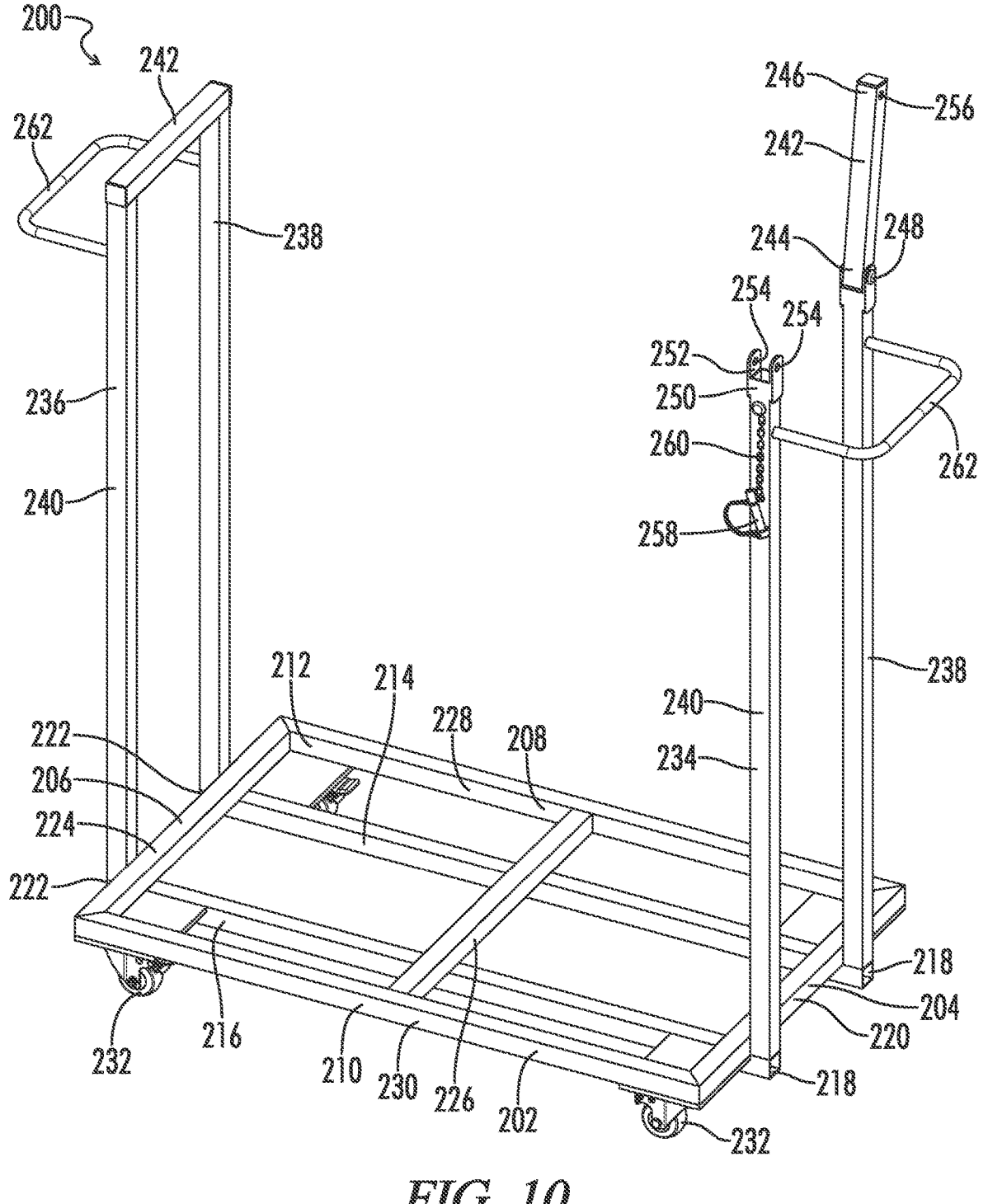
FIG. 10 is a perspective view of the transportation cart configured to transport a plurality of multipurpose tables. A cross-member is illustrated in an open position.

The first vertical support 234 is configurable in an open position or a closed position. The first vertical support 234 is illustrated in the open position in FIG. 10. In the open position, the cross-member 242 is pivoted away from the second vertical post 240 to allow the telescoping supports 24 of the multipurpose table 20 to pass between the first vertical post 238 and the second vertical post 240 when the multipurpose table 20 is being loaded on the transportation cart 200. In alternative embodiments, the second vertical support 236 may be configured in an open position or a closed position to allow for easier loading of multipurpose tables 20.

Figure 11:
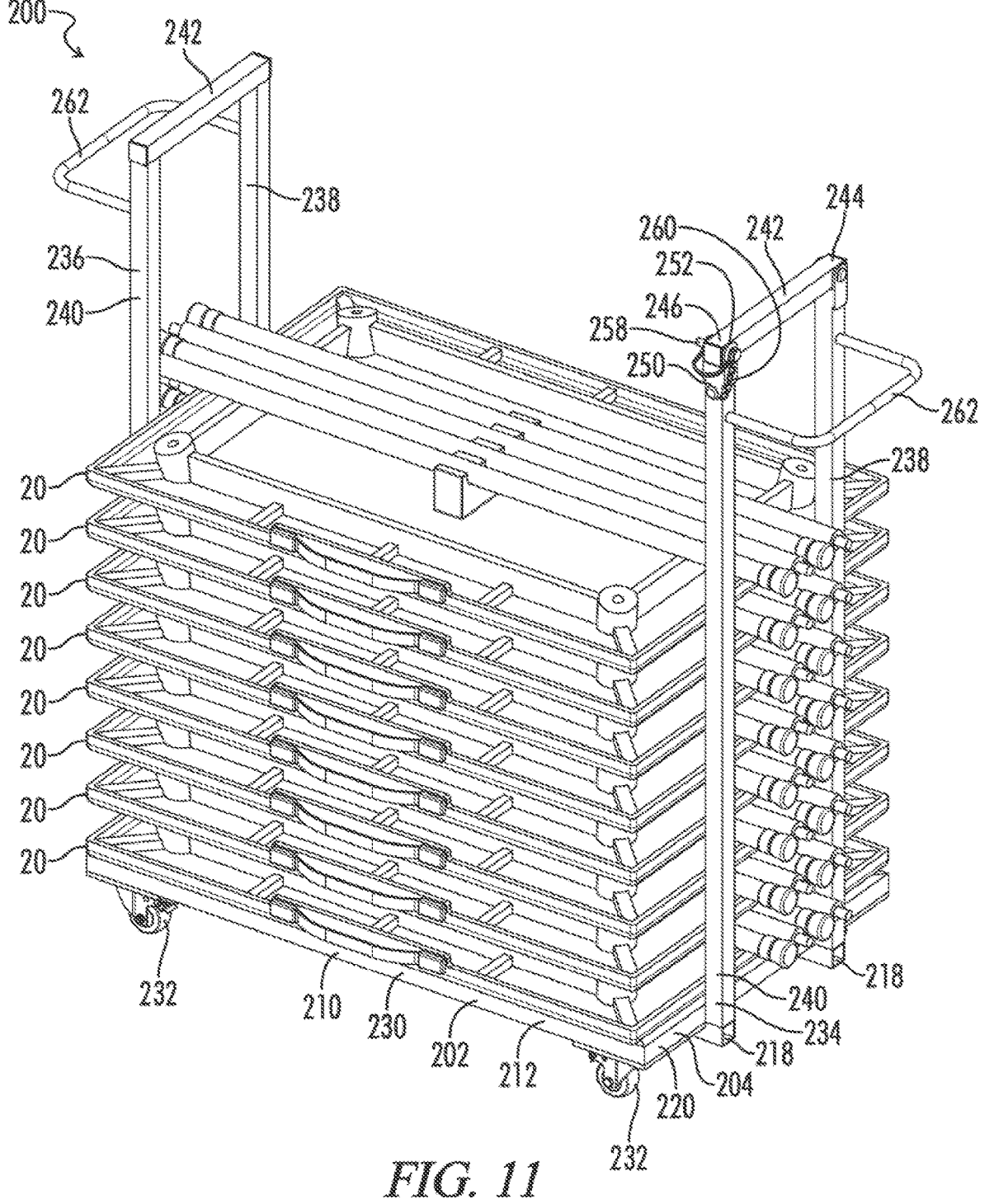
FIG. 11 is a perspective view of the transportation cart configured to transport a plurality of multipurpose tables. The cross-member is illustrated in a closed position.

The first vertical support 234 is illustrated in the closed position in FIG. 11. In the closed position, the cross-member 242 connects the first vertical post 238 to the second vertical post 240. The channel 252 of the second vertical post 240 receives the second end 246 of the cross-member 242 such that the cross-member hole 256 aligns with the channel holes 254.

The transportation cart includes an engagement pin 258 that is configured to extend through the channel holes 254 and the cross-member hole 256. The engagement pin 258 is coupled to the second vertical post 240 of the first vertical support 234 via a chain 260. The engagement pin 258 is depicted as a hitch pin with a square wire lock. However, any hitch pin may be used.

Each of the first vertical support 234 and the second vertical support 236 include a handle structure 262 coupled to the first vertical post 238 and the second vertical post 240. The transportation cart 200 includes multiple of the handle structures 262 so that the transportation cart 200 can be pushed or pulled by a user from a plurality of directions.

The use of multipurpose tables 20 in the video, audio, lighting, and production industry is prevalent. The multipurpose tables 20 are transported by removing the telescoping supports 24 from the base structure 22. The telescoping supports 24 are then coupled to the storage bracket 28 such that the telescoping supports 24 extend beyond the base structure 22. The transportation cart 200 is configured to transport one or more multipurpose tables 20 in an efficient manner. The transportation cart 200 is configured to support multipurpose tables 20 of various sizes.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A transportation cart configured to transport at least one video projection screen case, the transportation cart comprising:

a base frame for supporting the at least one video projection screen case, the base frame including a first side, a second side, a third side, and a fourth side;

a first base support rail and a second base support rail, each base support rail extending from the first side of the base frame to the second side of the base frame, each of the first and second base support rails being spaced apart from the third side and the fourth side of the base frame;

a first strap support rail and a second strap support rail, each strap support rail extending from the third side of the base frame to the first base support rail, each of the first and second strap support rails being spaced apart from the first side and the second side of the base frame;

a third strap support rail and a fourth strap support rail, each of the third strap support rail and the fourth strap support rail extending from the fourth side of the base frame to the second base support rail, each of the third strap support rail and the fourth strap support rail being spaced apart from the first side and the second side of the base frame;

a plurality of caster wheels for supporting the base frame from a ground surface;

a containment frame connected to the base frame and located a distance above the base frame such that an opening exists between the base frame and the containment frame;

a first strap circumscribing the first strap support rail and the second strap support rail, the first strap being configurable to secure the at least one video projection screen case; and a second strap circumscribing the third strap support rail and the fourth strap support rail, the second strap being configurable to secure the at least one video projection screen case.

2. The transportation cart of claim 1, further comprising the at least one video projection screen case supported by the base frame, wherein the first and second strap are configured to circumscribe the at least one video projection screen case restricting movement of the at least one video projection screen case, and the containment frame is configured to restrict movement of the at least one video projection screen case.

3. The transportation cart of claim 2, wherein the at least one video projection screen case includes three and only three video projection screen cases stacked in a vertical direction and supported by the base frame, wherein the first and second strap are configured to circumscribe the three video projection screen cases restricting movement of the three video projection screen cases, and the containment frame is configured to restrict movement of the three video projection screen cases.

4. The transportation cart of claim 1, wherein an opening length of the containment frame is in a range of from 44 to 64 inches.

5. The transportation cart of claim 1, wherein an opening width of the containment frame is in a range of from 6 to 26 inches.

6. The transportation cart of claim 1, wherein the base frame and containment frame are formed from tubing with a thickness in a range of from 0.5 to 1.5 inches.

7. The transportation cart of claim 1, wherein the first and second straps are configurable in either a closed position or an open position, wherein each strap is in a closed position when a first end and a second end of the strap are coupled and the strap forms a closed loop, wherein each strap is in an open position when the first end and the second end of the strap are decoupled.

8. The transportation cart of claim 1, wherein an opening length of the base frame is the same as an opening length of the containment frame and an opening width of the base frame is the same as an opening width of the containment frame.

* * * * *